A. T. HEDFELDT.
GRAIN SEPARATOR AND GRADER.
APPLICATION FILED FEB. 14, 1919.
1,410,472.
Patented Mar. 21, 1922.
3 SHEETS—SHEET 2.
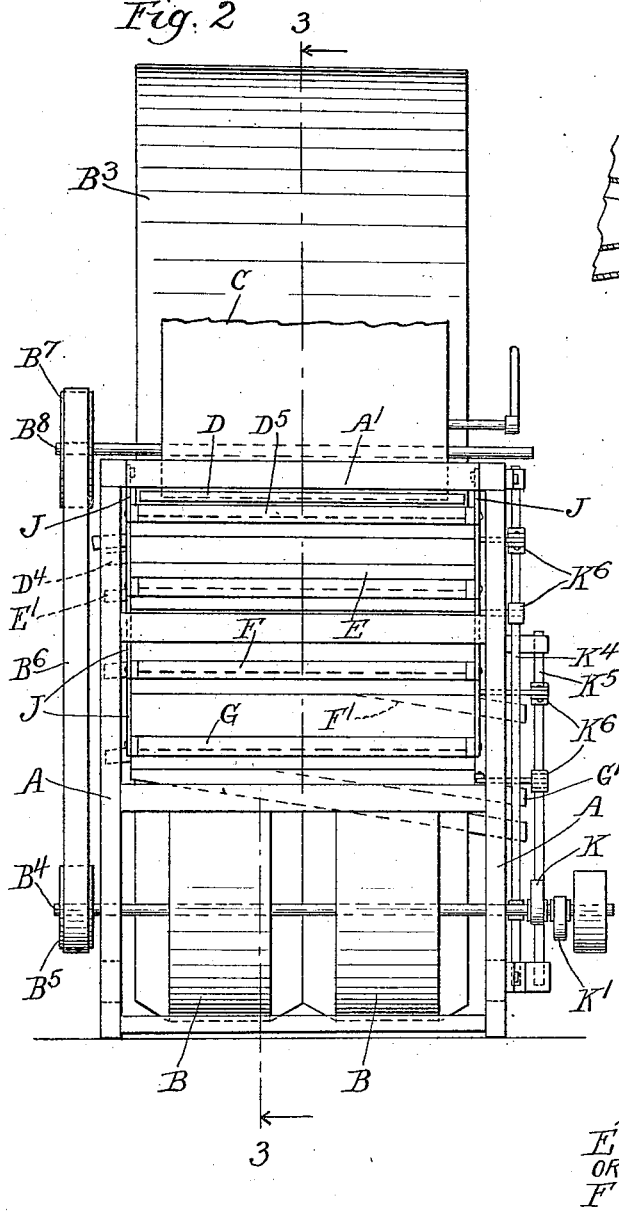
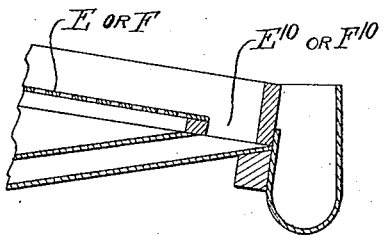
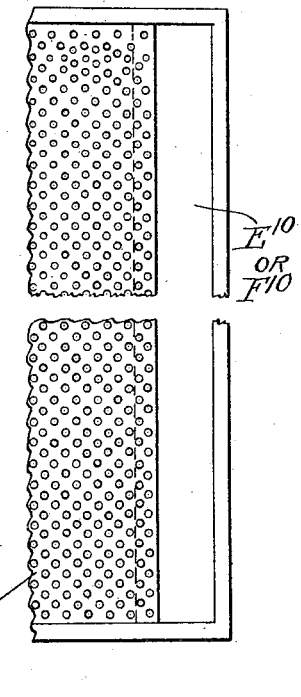
Witness.
Edward T. Wray.
Inventor.
Axel T. Hedfeldt.
by Parks & Carter
Attorneys.

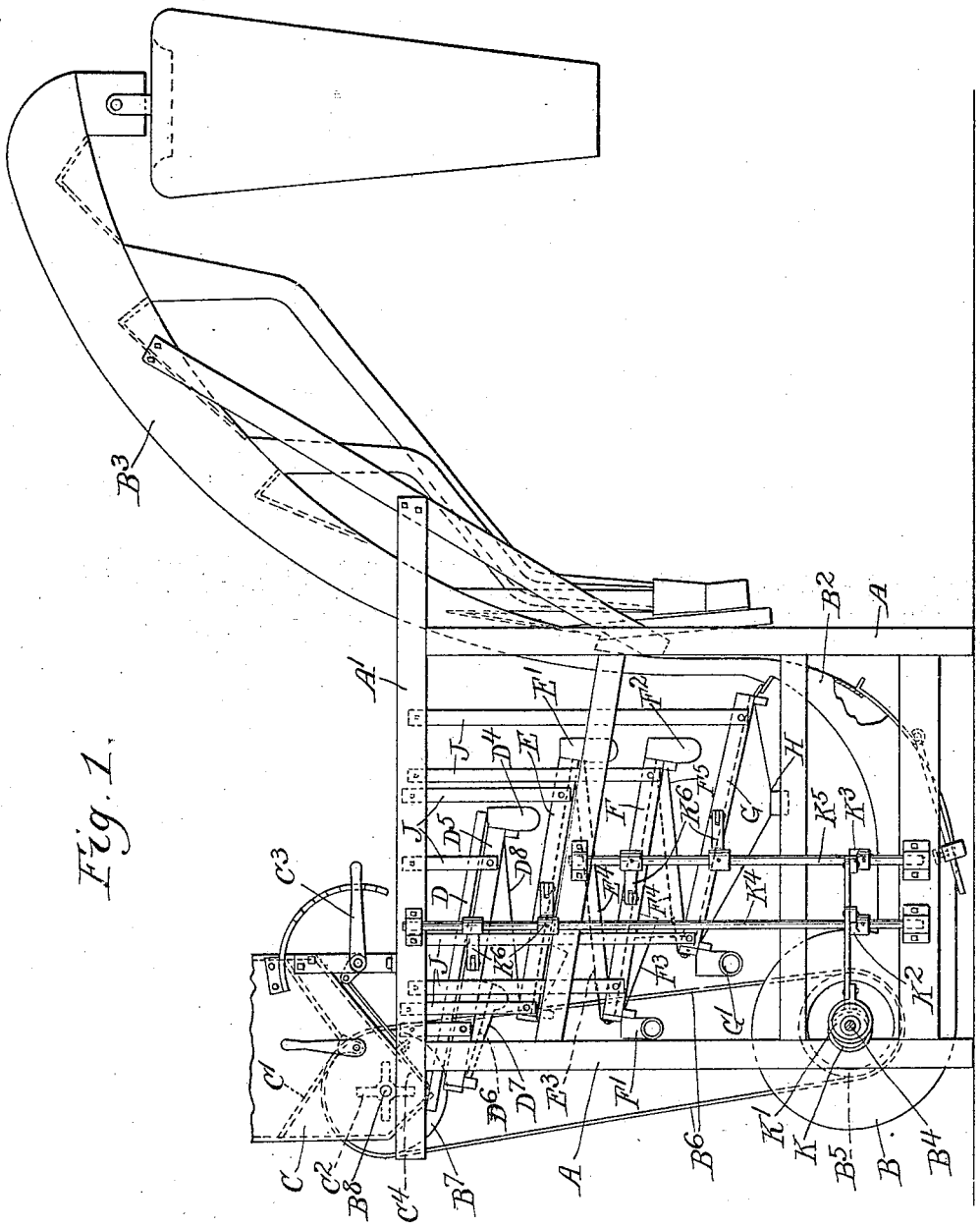

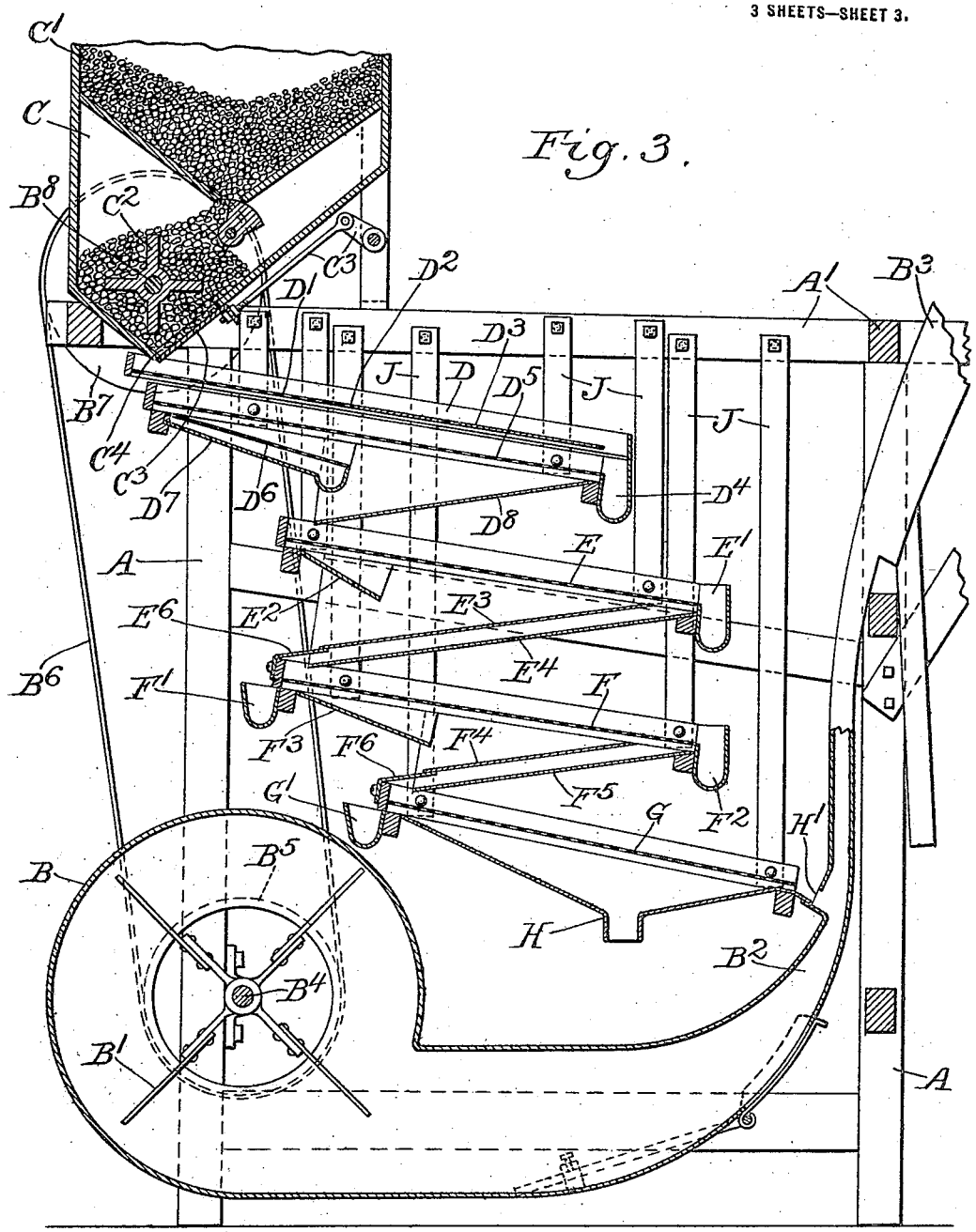

UNITED STATES PATENT OFFICE.

AXEL T. HEDFELDT, OF MINNEAPOLIS, MINNESOTA.

GRAIN SEPARATOR AND GRADER.

1,410,472. Specification of Letters Patent. Patented Mar. 21, 1922.

Application filed February 14, 1919. Serial No. 276,909.

*To all whom it may concern:*

Be it known that I, AXEL T. HEDFELDT, a citizen of United States, residing at Minneapolis, in the county of Hennepin and State of Minnesota, have invented a certain new and useful Improvement in Grain Separators and Graders, of which the following is a specification.

My invention relates to improvements in grain separating machines and concerns particularly improved screening devices for scouring, separating and grading the grain. An object of my invention is to provide a grouping of screens whereby a large number of such screens may be operated in a series within a restricted space. Another object is the provision of such a screen grouping that the grain may pass over the whole group in succession, or may pass over or through any desired number thereof. A further object is the furnishing of a high and even air pressure in connection with a pneumatic chute.

My invention is illustrated more or less diagrammatically in the accompanying drawings wherein Figure 1 is a side elevation;

Figure 2 is an end elevation;

Figure 3 is a section along the line 3—3 of Fig. 2;

Figures 4 and 5 are detailed features of the screen used.

Like parts are indicated by like characters in all the figures.

A is a supporting framework made in any suitable manner to support the working parts, and carries at its top the horizontal structure $A^1$. Adjacent its base it carries the fan housing B, having within it the fan or fans $B^1$, which drive air under high pressure up the air passage $B^2$ and through the pneumatic grading chute $B^3$, the details of which do not concern the present invention. The chute $B^3$ is supported in any suitable way, as from the framework A. The fans $B^1$, which may be of any suitable number, or may be replaced by a single fan, are mounted on the shaft $B^4$, driven from any suitable source of power. It is important that this fan or these fans should have an axial length approximately that of the breadth of the air passage at the point at which the grain is dropped therein. Mounted on the shaft $B^4$ is a pulley $B^5$ connected by a belt $B^6$ to a pulley $B^7$ on a shaft $B^8$, mounted on the structure $A^1$.

Mounted on the same structure is the housing C, through which the shaft $B^8$ passes, containing the feed hopper $C^1$ and the scouring roller $C^2$ which is mounted on the shaft $B^8$, and driven by the pulley $B^7$ and belt $B^6$, from the shaft $B^4$. $C^3$ represents adjusting means for adjusting the discharge opening $C^4$ from the hopper housing.

Beneath the discharge opening $C^4$ lies the upper edge of the inclined chaffer screen D. This chaffer is composed of an upper screen $D^1$ coarsely meshed or perforated and continuing only to the point $D^2$, beyond which point extends an unbroken surface $D^3$, which feeds into the discharge trough $D^4$. Beneath the upper screen and parallel with it is the screen $D^5$. Below the two screens, as far as $D^2$, lies a screen $D^6$ and a catch surface $D^7$ beneath it, adapted to sift and carry off fine, heavy impurities. This screen $D^6$ is inclined in the same direction as the screen $D^5$ but at a greater angle. Extending from the lower edge of $D^5$, lying beneath it, and inclined in the opposite direction, is the plate $B^8$, which receives screenings of the screen $D^5$ and the grain delivered by the screen $D^6$, and deposits it on the upper edge of the inclined screen E. At the lower edge of this screen is the discharge chute $E^1$. Beneath its upper end is a short, inclined plate $E^2$, adapted to direct the siftings of the screen above to the plate $E^3$ which extends from a point near the lower edge of the screen to the upper edge of the screen next beneath. Beneath the plate $E^3$ and parallel with it is plate $E^4$ extending from the lower edge of E to the upper edge of the screen F below. The length of the two plates is such that the lower one $E^4$ delivers its grain to the upper edge of the screen F while the upper plate $E^3$ directs its grain over the edge of the screen into the discharge chute $F^1$. At the lower edge of the screen F is the discharge chute $F^2$ similar to $E^1$, and beneath the screen are the plates $F^3$, $F^4$ and $F^5$ similar to $E^2$, $E^3$ and $E^4$. The plates $E^3$ and $F^4$, which normally deliver grain to the discharge chutes F¹ and G¹, are provided at their lower edges with removable sections E⁶ and F⁶. When these are removed the plates deliver, as do E⁴ and F⁵, to the upper edge of the screens F and G.

The screens E and F, and it will be understood that any suitable number of screens may be used, are normally meshed or perforated over their whole surface. It is desirable, for purposes later set forth, that under some conditions openings E¹⁰ and F¹⁰ be provided along the lower edge of each screen, just short of the discharge chutes E¹ and F². These may be provided by a substitution of screens, or by an adjustable or removable part in each screen or by any other suitable means fitted for this purpose. It is important that they extend entirely across the screen.

In order that the screens may be suspended or supported, I suspend them from spring members J, secured at their tops to the structure A¹ and at their bottoms to the screens. These different members are made of suitable length to support each screen, a plurality of them to each. Loosely pivoted members may be used in place of the spring members.

Two eccentrics, K, K¹ on the shaft B⁴ move arms K², K³ which, through rock shafts K⁴ and K⁵, attached to the screens by the members K⁶, oscillate the screens in response to the rotation of the shaft B⁴.

It will be evident from my drawings that while I have shown an operative device, still many changes might be made both in size, shape and arrangement of parts without departing materially from the spirit of my invention, and I wish therefore that my drawings be regarded as in a sense diagrammatic.

My invention has been described in particular in relation to the functions of screening grain. It will be obvious that it lends itself equally well to the screening, sifting and sorting of numerous other substances, and I do not wish to limit myself to a device for screening grain. Evidently, by relatively small modifications of parts, the device will be made suitable to handling a large variety of diverse materials.

The use and operation of my invention are as follows:—

The series of screens are placed one above the other. Except for the first and the last screen, each is capable of adjustment at its lower end to feed either to a discharge chute, or to a returning board, which carries the grain to the screen below. This board which returns the screenings, is adjustable to feed either to a discharge chute or to the screen next below. The operator can grade his grain by carrying off the unscreened grain from each screen, since it feeds directly into a discharge chute. In such a case the upper plate is shortened to deposit all the screenings from the screen above on the top of the next screen. Thus the unscreened grain is delivered from the top of the screen to the discharge chute which carries it out of the system, while the screenings are deposited on the screen below for rescreening. This process can be reversed by leaving the upper plate at full extension whereby it will deliver into the discharge chute at the upper edge of the screen below, and by adjusting the screen above to deliver the unscreened grain to the lower plate. The screened grain is then fed into and carried off by the chute at the upper end of the screen while the unscreened grain is deposited on the screen itself. By shifting the adjustment of the screens and the plates, a broad range of variations in screen combinations is allowed. The material to be separated can be repeatedly run over any number of screens, by carrying the screenings, or portion that goes through the screen, back and over the upper end of the screen below by the upper return-board, while the portion that goes over the screen is carried back by the lower return-board and dropped on the upper end of the screen below; or the material can be repeatedly run through any number of screens, by removing the extension at the lower end of the upper return-board and dropping the material on the upper end of the screen below. The portion that goes over the screen is then carried off by the spout at the lower end of each screen.

The grain from the last section is fed into a passage whence an air blast carries it to a discharge chute. The passage is the width of the screens and the fan or fans, being disposed across the whole breadth of the passage, insure a full and even pressure of air, whereby the grain in the passage will be carried at the even rate of speed absolutely essential for pneumatic, accurate grading.

I claim:—

1. A grain separating machine comprising a feed hopper and a series of inclined screens placed one beneath another, grain discharging means along the upper edge of said screens, an inclined plate connecting the lower edge of said screens with the upper edge of the screen next below, a second inclined plate above it leading from the lower edge of the screen above to the grain discharging means along the upper edge of the screen below.

2. A grain separating machine comprising a feed hopper and a series of inclined screens placed one beneath another, grain discharging means along the upper edge of said screens, an inclined plate connecting the lower edge of said screens with the upper edge of the screen next below, a second inclined plate above it leading from the lower edge of the screen above to the upper edge of the screen below, together with removable means for adapting said upper plate to feed into the grain discharging means along said upper edge.

3. A grain separating machine comprising a feed hopper and a series of inclined screens placed one beneath another, grain discharging means disposed along the lower edge of said screens, an inclined plate leading from the lower edge of said screens to the upper edge of the screen next below, a second inclined plate, above said plane leading from a point slightly above the lower edge of the screen above to the upper edge of the screen next below, each screen adapted normally to feed substantially all of its unscreened grain into the discharging means disposed along its lower edge, together with means for adapting it to feed said unscreened grain directly to the lower inclined plate.

4. A grain separating machine comprising a feed hopper and a series of inclined screens placed one beneath another, grain discharging means disposed along the lower edge of said screens, an inclined plate leading from the lower edge of said screens to the upper edge of the screen next below, a second inclined plate, above said plane leading from a point slightly above the lower edge of the screen above to the upper edge of the screen next below, each screen adapted normally to feed substantially all of its unscreened grain into the discharging means disposed along its lower edge, together with means for adjusting it to feed said unscreened grain directly to the lower inclined plate, comprising means for making a longitudinal opening across the lower edge of the screen above the discharge means.

5. A grain separating machine comprising a feed hopper and a series of inclined screens placed one beneath another, grain discharging means disposed along the upper and lower edge of said screens, an inclined plate leading from the lower edge of said screens to the upper edge of the screen next below, a second inclined plate lying above the lower edge of each plate to the upper edge of the screen next below, together with removable means for adapting said upper plate to feed into the grain discharging means along said upper edge, each screen adapted normally to feed its unscreened grain into the discharging means disposed along its lower edge, together with means for adjusting it to feed said unscreened grain directly to the lower inclined plate.

6. A series of inclined grain separating screens placed one beneath the other, means within the screen surface for adapting the screens either to discharge the unscreened grain from the series or to deliver it to the screen next below.

7. A series of inclined grain separating screens placed one beneath the other, separate means within the screen surface for adapting each screen either to discharge its unscreened grain from the series or to deliver it to the screen next below.

8. A series of inclined grain separating screens placed one beneath the other, means for adapting a plurality of the screens either to discharge the unscreened grain from the series or to deliver it to the screen next below, comprising grain discharge means along the lower edge of each screen conveying means adapted to deliver grain to the screen below and means for adapting the screen to deliver grain either to the discharge means or to the conveying means.

9. A series of inclined grain separating screens placed one beneath the other, separate means for adapting a plurality of said screens either to discharge its unscreened grain from the series or to deliver it to the screen next below, comprising grain discharge means along the lower edge of each screen conveying means adapted to deliver grain to the screen below and means for adapting the screen to deliver grain either to the discharge means or to the conveying means.

10. A series of inclined grain separating screens placed one beneath the other, separate means for adapting a plurality of said screens either to discharge its unscreened grain from the series or to deliver it to the screen next below, comprising grain discharge means along the lower edge of each screen conveying means adapted to deliver grain to the screen below and means for adapting the screen to deliver grain either to the discharge means or to the conveying means, by alternately providing or closing a transverse opening adjacent but within the lower edge of the screen.

11. A series of inclined grain separating screens placed one beneath the other, conveying means connecting the lower edge of each of a plurality of screens, with the screen below, said conveying means adapted normally to deliver grain to the screen below, and means for adapting said conveying means to discharge grain from the series.

12. A series of inclined grain separating screens placed one beneath the other, conveying means connecting the lower edge of a plurality of said screens with the screens below, means for adapting the screens either to discharge substantially all of the unscreened grain from the series or to deliver it to the conveying means beneath it said means comprising the alternate opening or closing of a transverse opening adjacent but within the lower edge of the screen and over the upper end of said conveying means, and means for adapting said conveying means to deliver the grain either to the screen below, or to discharge it from the series, comprising a removable extension at the lower end of said conveying means.

13. In a series of inclined grain separating screens, spaced one beneath the other, a conveying means connecting the lower edge of each of a plurality of said screens with the upper edge of the screen below and normally adapted to discharge grain thereon, and means for adapting said conveying means to discharge grain from the series.

14. In a series of inclined grain separating screens, spaced one beneath the other, plates connecting the lower edge of each of a plurality of said screens with the upper edge of the screen below, and normally adapted to discharge grain thereon, and means for adapting said plates to discharge grain from the series.

15. In a series of inclined grain separating screens, spaced one beneath the other, plates connecting the lower edge of each of a plurality of said screens with the upper edge of the screen below, and normally adapted to discharge grain thereon, and means for adapting said plates to discharge grain from the series, comprising extensions adapted to be attached to said plates.

16. A series of inclined grain separating screens placed one beneath the other, conveying means connecting the lower edge of each of a plurality of screens, with the screen below, said conveying means adapted normally to deliver grain to the screen below, and means for adapting said conveying means to discharge grain from the series, comprising a removable extension to the lower edge of said conveying means.

In testimony whereof, I affix my signature in the presence of two witnesses this 24th day of January, 1919.

AXEL T. HEDFELDT.

Witnesses:
JAY C. HALL,
JENNIE GOODMAN.